(12) United States Patent
Martel

(10) Patent No.: US 8,827,014 B2
(45) Date of Patent: Sep. 9, 2014

(54) COMPACT PULLING APPARATUS

(71) Applicant: Yvon Martel, Chicoutimi (CA)

(72) Inventor: Yvon Martel, Chicoutimi (CA)

( * ) Notice: Subject to any disclaimer, the term of this patent is extended or adjusted under 35 U.S.C. 154(b) by 0 days.

(21) Appl. No.: 13/907,471

(22) Filed: May 31, 2013

(65) Prior Publication Data

US 2013/0264130 A1  Oct. 10, 2013

Related U.S. Application Data

(63) Continuation-in-part of application No. 13/650,965, filed on Oct. 12, 2012, now Pat. No. 8,528,672, which is a continuation of application No. PCT/CA2011/050202, filed on Apr. 15, 2011.

(60) Provisional application No. 61/342,538, filed on Apr. 15, 2010.

(51) Int. Cl.
*B62D 55/07* (2006.01)

(52) U.S. Cl.
USPC .......................................... 180/9.22; 454/141

(58) Field of Classification Search
USPC ................. 180/9.1, 9.22, 10; 454/69, 141
See application file for complete search history.

(56) References Cited

U.S. PATENT DOCUMENTS

| | | |
|---|---|---|
| 758,757 A | 5/1904 | Jones |
| 1,287,261 A | 12/1918 | Domer |
| 1,317,103 A | 9/1919 | Rimailho |
| 2,046,560 A | 7/1936 | Johnson et al. |
| 2,196,458 A | 4/1940 | Flynn et al. |
| 2,289,768 A | 7/1942 | Fehrenbacher |
| 2,345,496 A | 3/1944 | Opheim |
| 2,393,309 A | 1/1946 | Cochran |
| 2,519,745 A | 8/1950 | Danielson et al. |
| 2,702,088 A | 2/1955 | Klimek |
| 2,855,059 A | 10/1958 | Sutherland |
| 3,068,950 A | 12/1962 | Davidson |
| 3,146,840 A | 9/1964 | Walsh |
| 3,221,830 A | 12/1965 | Walsh |
| 3,231,036 A | 1/1966 | Appenrodt |
| 3,269,475 A | 8/1966 | Voelker |
| 3,398,806 A | 8/1968 | Hendricks |
| 3,418,961 A | 12/1968 | Gregg |
| 3,427,078 A | 2/1969 | Parsons |
| 3,554,300 A | 1/1971 | Rosenberg |
| 3,568,787 A | 3/1971 | Gremeret |
| 3,590,523 A | 7/1971 | Riesgraf |
| 3,610,355 A | 10/1971 | Buck |
| 3,645,348 A | 2/1972 | Thompson |
| 3,734,221 A | 5/1973 | Labelle |

(Continued)

FOREIGN PATENT DOCUMENTS

| | | |
|---|---|---|
| CA | 2135653 A1 | 9/1996 |
| CA | 2294527 A1 | 12/1998 |

(Continued)

*Primary Examiner* — Kevin Hurley
(74) *Attorney, Agent, or Firm* — Ipaxio S.E.N.C.

(57) ABSTRACT

The apparatus includes a watertight elongated housing extending along a longitudinal axis and defining an inner chamber, a track disposed around the housing on its longitudinal axis and enabling the apparatus to move when the track is rotatably driven around the housing, and a track-driving motor. The motor is located within the inner chamber of the housing and includes an output shaft mechanically connected to the track. The apparatus can also include a ventilation circuit for ventilating the inner chamber of the housing and a generator for producing electricity. A method of operating a motorized pulling apparatus is also disclosed.

7 Claims, 13 Drawing Sheets

(56) References Cited

U.S. PATENT DOCUMENTS

| | | |
|---|---|---|
| 3,750,777 A | 8/1973 | Thompson |
| 3,809,173 A | 5/1974 | McLeod |
| 3,826,323 A | 7/1974 | Mehne |
| 3,853,192 A | 12/1974 | Husted |
| 3,964,560 A | 6/1976 | Husted |
| 4,096,919 A | 6/1978 | Thompson |
| 4,102,292 A | 7/1978 | Hunter et al. |
| 4,146,101 A | 3/1979 | Plourde |
| 4,175,627 A | 11/1979 | Husted |
| 4,257,652 A | 3/1981 | Edwards |
| 4,421,193 A | 12/1983 | Bissett |
| 4,433,634 A | 2/1984 | Coast |
| 4,519,470 A | 5/1985 | Allisio |
| 4,789,037 A | 12/1988 | Kneebone |
| 4,981,188 A | 1/1991 | Kadela |
| 4,984,648 A | 1/1991 | Strzok |
| 5,174,405 A | 12/1992 | Carra et al. |
| 5,181,478 A | 1/1993 | Berardi |
| 5,193,632 A | 3/1993 | Clar et al. |
| 5,332,058 A | 7/1994 | Bianco |
| 5,363,937 A | 11/1994 | James |
| 5,662,186 A | 9/1997 | Welch |
| 5,799,743 A | 9/1998 | Robinson |
| 6,193,003 B1 | 2/2001 | Dempster |
| 6,408,962 B1 | 6/2002 | Ryckman |
| 6,725,959 B1 | 4/2004 | Shea et al. |
| 6,880,651 B2 | 4/2005 | Loh et al. |
| 7,343,644 B2 | 3/2008 | Elmer |
| 7,434,644 B2 | 10/2008 | Wier |
| 7,575,075 B2 | 8/2009 | Fairhead |
| 7,905,310 B2 | 3/2011 | Hues |
| 8,030,860 B2 | 10/2011 | Yoshioka |
| 2011/0011652 A1 | 1/2011 | Swenson |
| 2012/0110878 A1 | 5/2012 | Mayer et al. |
| 2012/0225596 A1 | 9/2012 | Schmidt et al. |
| 2013/0037332 A1 | 2/2013 | Martel |

FOREIGN PATENT DOCUMENTS

| | | |
|---|---|---|
| CA | 2762353 A1 | 10/2011 |
| CA | 2772513 A1 | 10/2011 |
| CA | 2776417 A1 | 10/2011 |
| DE | 4409677 A1 | 8/1994 |
| EP | 0091707 A1 | 10/1983 |
| EP | 0572880 A1 | 12/1993 |
| EP | 1924487 B1 | 7/2009 |
| FR | 1169880 A | 1/1959 |
| FR | 2431304 A1 | 2/1980 |
| FR | 2450191 A1 | 9/1980 |
| FR | 2604367 A1 | 4/1988 |
| FR | 2673545 A1 | 9/1992 |
| FR | 2688701 A1 | 9/1993 |
| FR | 2893585 A1 | 5/2007 |
| GB | 140121 | 3/1920 |
| GB | 1042943 | 9/1966 |
| GB | 2144689 A | 3/1985 |
| GB | 2390837 A | 1/2004 |
| JP | 2007182137 A | 7/2007 |
| WO | 9415683 A1 | 7/1994 |

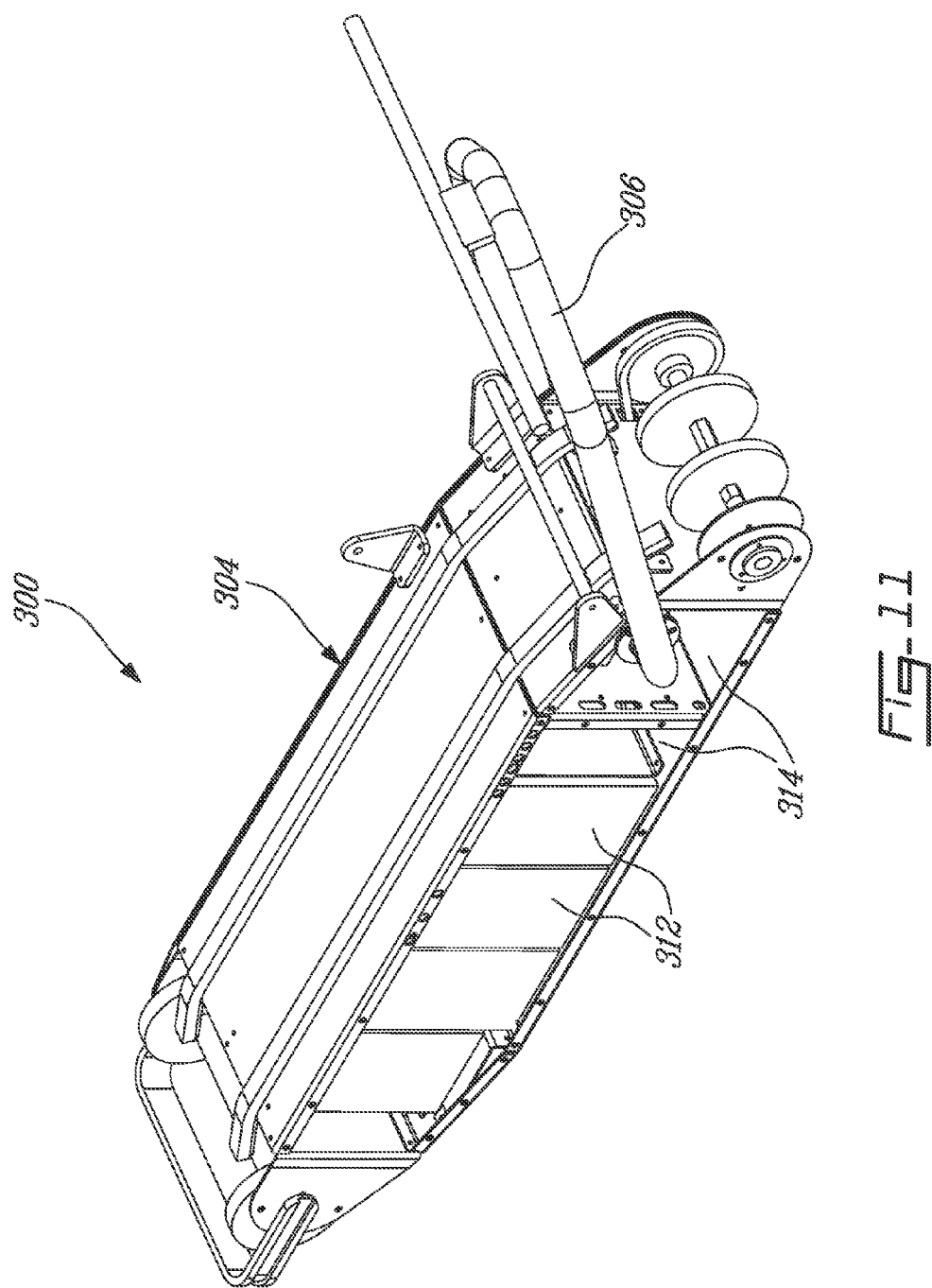

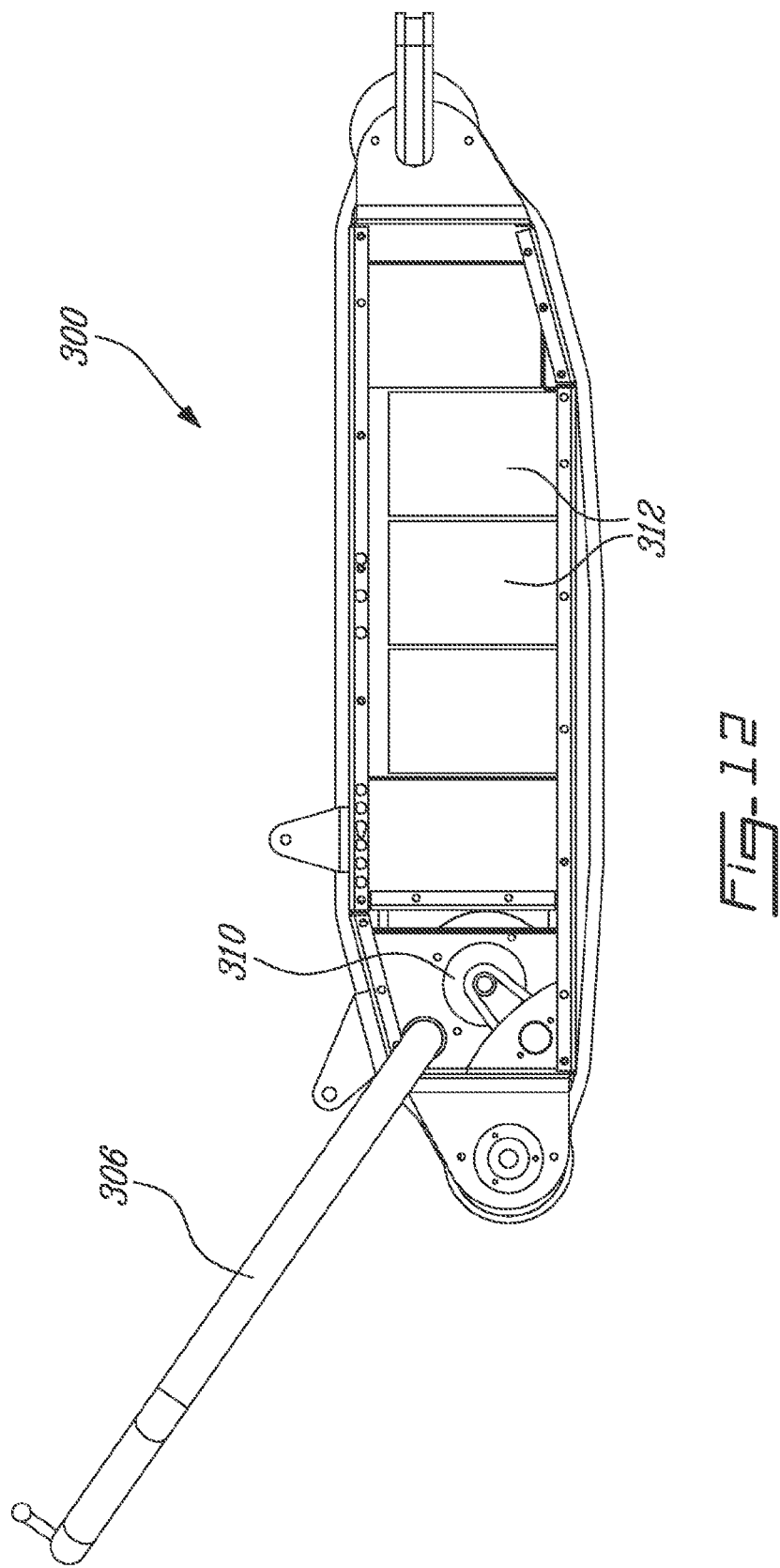

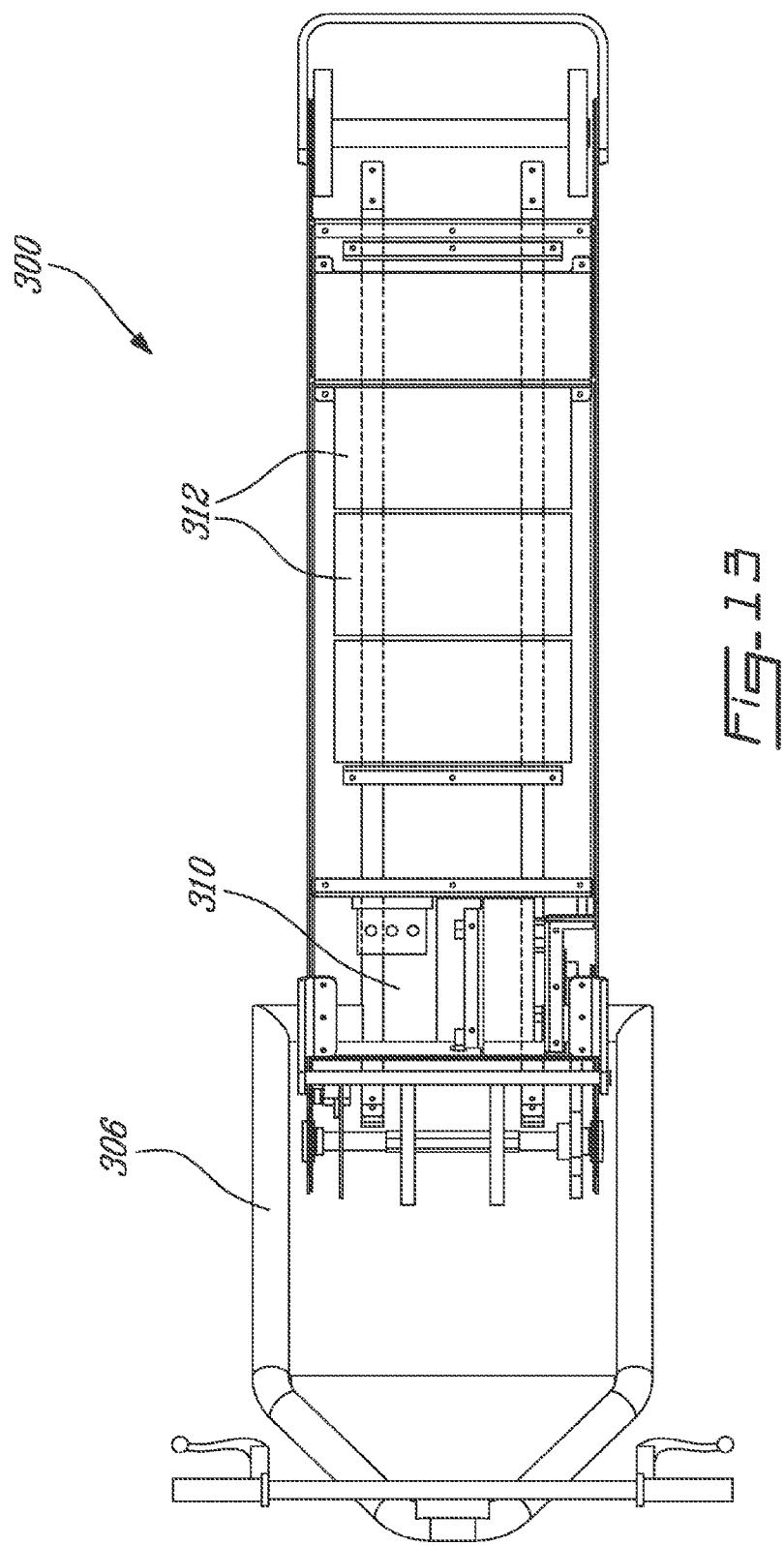

COMPACT PULLING APPARATUS

CROSS-REFERENCE TO RELATED APPLICATIONS

This application is a continuation-in-part of U.S. patent application Ser. No. 13/650,965 filed on 12 Oct. 2012, which is a continuation of PCT Patent Application No. PCT/CA2011/050202 filed on 15 Apr. 2011, which PCT Patent Application claims priority to U.S. Provisional Patent Application Ser. No. 61/342,538 filed on 15 Apr. 2010, the entire contents of which applications are hereby incorporated by reference in their entirety.

TECHNICAL FIELD

The technical field relates to compact pulling apparatuses capable of travelling over difficult terrains, such as terrains covered with snow, sand, mud, etc.

TECHNICAL BACKGROUND

Various apparatuses have been suggested over the years for travelling on difficult terrains. Of these, several are compact apparatuses allowing one person, in particular a person on skis, to be pushed or pulled using a track rotatably driven by a motor. Examples can be found in documents FR-2,431,304 (Jaulmes) published on 15 Feb. 1980 and in U.S. Pat. No. 4,519,470 (Allisio) published on 28 May 1985. Numerous other examples exist. Most of these apparatuses use a gasoline engine to rotatably drive the track. Some use an electric motor. Apparatuses of this sort can be useful as light means of transportation, particularly where it is difficult or even forbidden to travel using a larger vehicle. For example, in terrains with a snow-covered surface, the snow could be too powdery or too deep to use a snowmobile. Another advantage of such apparatuses is that it is much more simple and easy to transport them in another vehicle than is the case with a larger and heavier vehicle, for instance a snowmobile.

Unfortunately, none of the previously-suggested apparatuses has proven fully adapted to the very rigorous winter conditions encountered during parts of the year in places where such apparatuses are likely to be useful. For instance, a very cold temperature can significantly hinder the reliability and the autonomy of an apparatus using an electric motor powered using batteries. In the case of a gasoline engine, the combination of cold weather and heat released from the engine can cause ice and compacted snow to build up at sensitive points of the apparatus. Moreover, milder temperatures are more likely to cause water infiltrations into the apparatus, which can then result in failures difficult to repair, especially if they occur deep into the forest or in other places that are difficult to access.

Also, the previously-suggested apparatuses do not allow an electric generator to be easily transported to places that are difficult to access.

It is therefore clear that improvements in the related technical field are still needed.

SUMMARY

According to one aspect, there is provided a method of operating a compact pulling apparatus of the type including a watertight elongated housing extending along a longitudinal axis and defining an inner chamber inside which a motor is located, and also including a track disposed around the housing along its longitudinal axis and enabling the apparatus to move when the track is rotatably driven around the housing by the motor, the method including the following simultaneous steps: maintaining a minimum temperature in the inner chamber using heat released by the motor; evacuating heat from within the inner chamber if the temperature exceeds a given threshold; and maintaining a positive pressure within the inner chamber.

More details on this aspect, as well as on other aspects of the proposed concept, will become apparent in light of the detailed description which follows and the appended figures.

BRIEF DESCRIPTION OF THE FIGURES

FIGS. 8 to 13 are views similar to FIGS. 1 to 6 but show a second example of the apparatus in which an electric motor is used.

DETAILED DESCRIPTION

Figure 1:
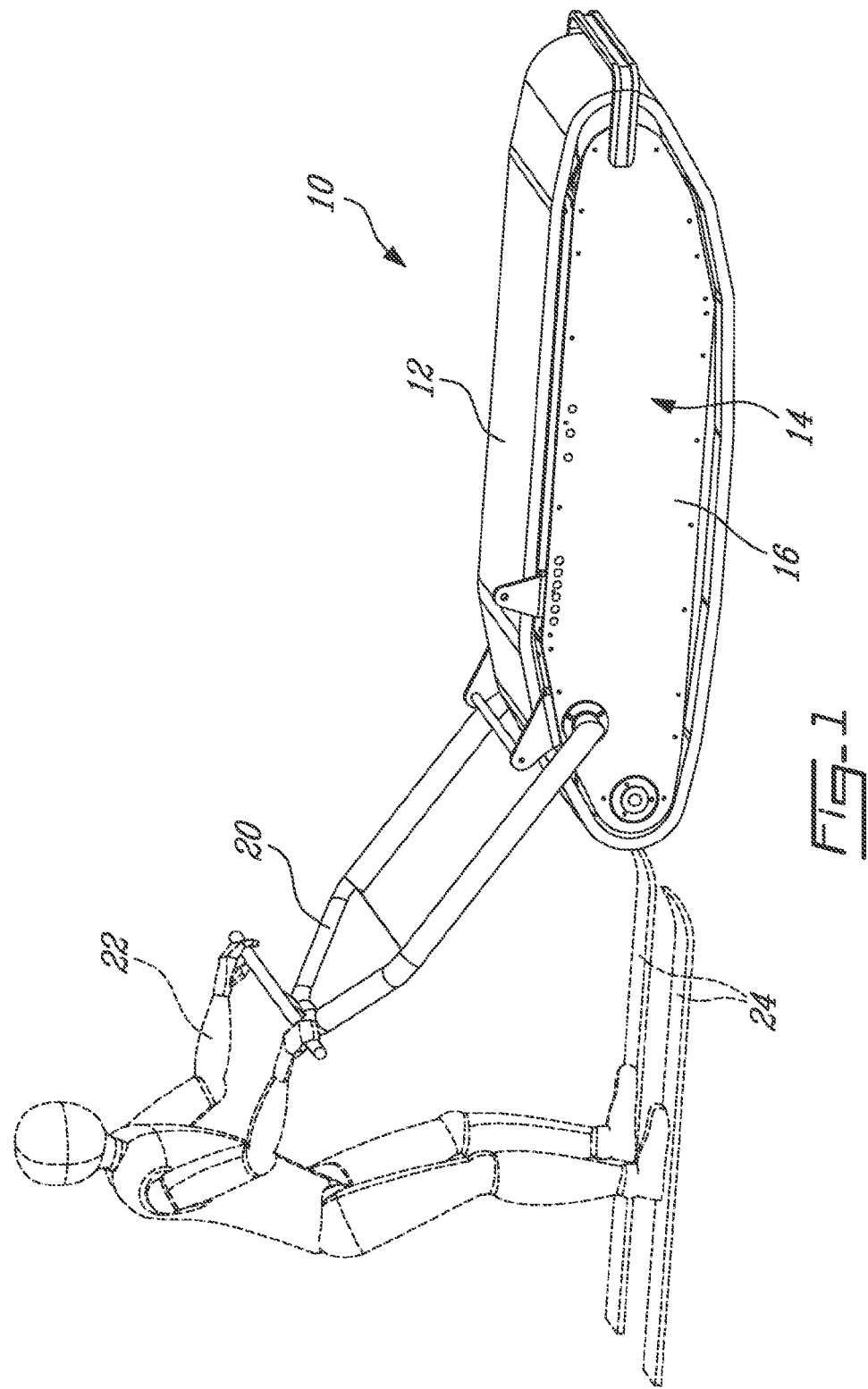
FIG. 1 is an isometric view of an example of an apparatus designed using the proposed concept.

FIG. 1 is an isometric view of an example of an apparatus 10 including the proposed concept. In this example, the apparatus 10 uses a gasoline engine to rotate a track 12 disposed around a watertight housing 14 having an elongate form. It should be noted that in the present context, the word "gasoline" must be understood as a liquid fuel and is not meant to exclude liquid fuels such as diesel or any other suitable kinds and/or mixtures of liquid fuels. It should also be noted at this point that the reference to a "watertight" housing means that its construction is watertight but this does not exclude the presence of a ventilation circuit for the interior of the housing 14. This ventilation circuit includes at least one air inlet and one air outlet. The ventilation circuit makes it possible, among other things, to cool the interior of the housing 14 when its temperature exceeds an upper threshold, for example above 25° C. Other values are also possible.

The rotation of the track 12 around the housing 14 enables the apparatus 10 to move. The housing 14 is low-slung in order to keep its center of gravity as low as possible. The housing 14 includes a lateral wall 16 on each side. The housing 14 can, for example, be made of a metallic material, a plastic material, or both. Aluminum is an example of one possible material for the housing 14 since this material is light and strong. The track 12 can be made of rubber or some other polymer. Other materials are possible.

The illustrated apparatus 10 includes a handlebar 20 which is connected to the housing 14. The handlebar 20 extends substantially rearward of the apparatus 10. The handlebar 20 is intended to be held and manipulated by an operator 22 who is at the rear of the apparatus 10, as shown in a semi-schematic manner in FIG. 1. The handlebar 20 can be pivotal or fixed, depending on the needs. When pivotal, it is possible to limit the pivoting of the handlebar 20 between a minimum angle and a maximum angle with respect to the horizontal.

It should be noted that the handlebars 20 may be omitted in some implementations.

In the illustrated implementation, the operator 22 can be provided with skis 24 (or the equivalent) or be on board a sled hitched to the apparatus 10. As can be seen in FIG. 1, the center of gravity of the apparatus 10 is at a height that is below the knees of the operator 22.

The operator 22 has controls available on the handrests of the handlebar 20 which allow, among other things, controlling the travelling speed of the apparatus 10 and other functions. The controls (not shown) can be connected to the housing 14 using wires and/or by wireless communication means, for instance. Depending on the model, it is also possible to provide a device which enables the apparatus 10 to back up by its own motor power which can be very useful in certain circumstances. Levers for operating a brake can also be provided (see FIG. 13). These levers can be placed similarly to those of the brakes on a bicycle or a motorcycle, for instance. Other elements can be provided on the handlebar 20 according to requirements, such as a lamp, indicator dials, etc. Other configurations and arrangements are possible as well.

When travelling forward, the apparatus 10 pulls the operator 22 along and, if required, transports a payload such as a payload placed on board a sled hitched to the apparatus 10 or on a rack over the apparatus 10. Such apparatus 10 can easily pull a load equivalent to at least twice its own weight in powder snow. For example, tests carried out using an apparatus weighing 125 kg (275 lbs) have shown that such an apparatus was able to pull a load of more than 225 kg (550 lbs) over a distance of 150 km on a single fuel tank.

The operator 22 can change the direction of the apparatus 10 by moving the handlebar 20 sideways in the direction opposite the turn to be made. This maneuver is similar to the one made by the operator of a small conventional lawn mower.

Figure 2:
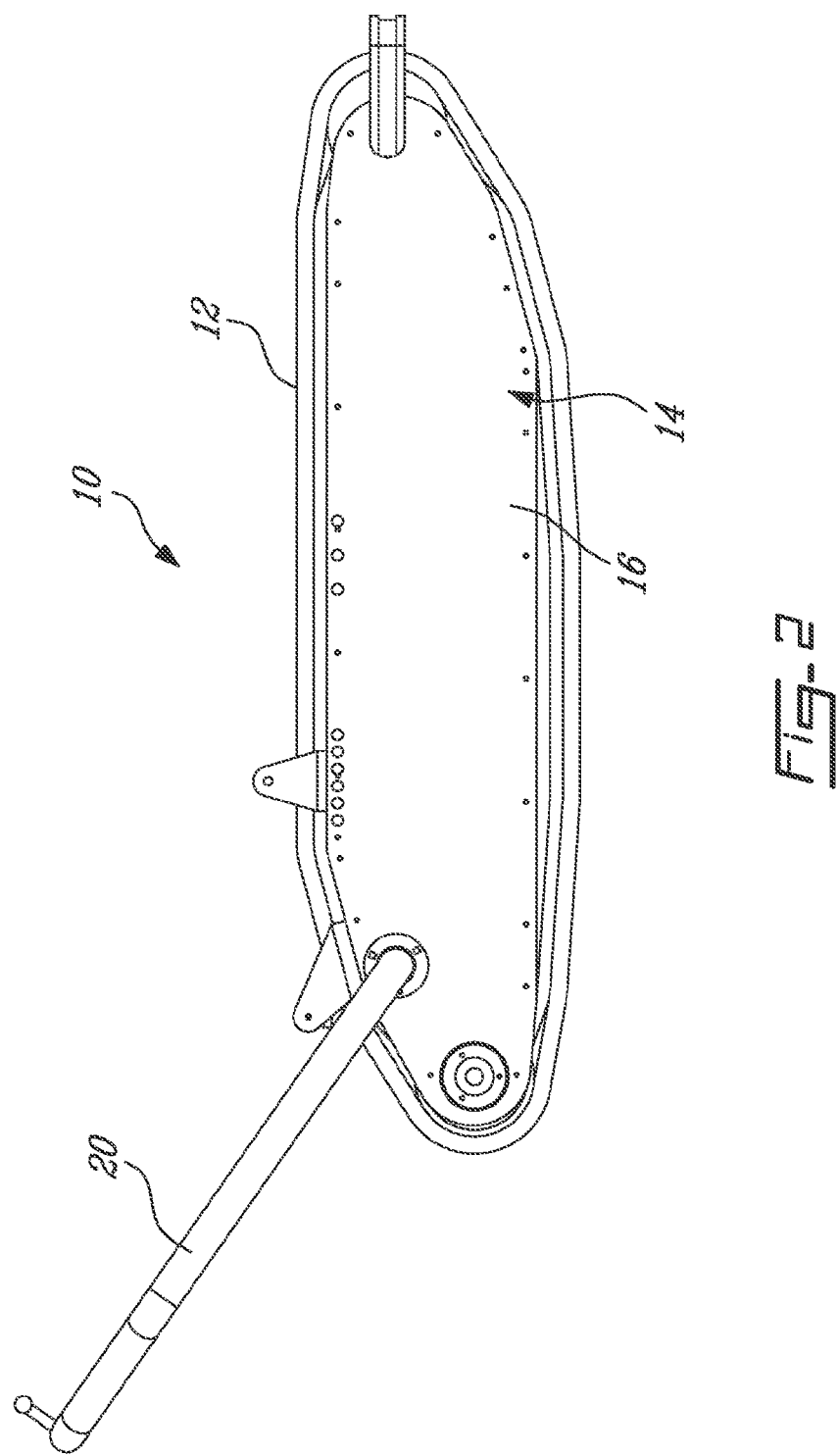
FIG. 2 is a side view of the apparatus shown in FIG. 1.
Figure 3:
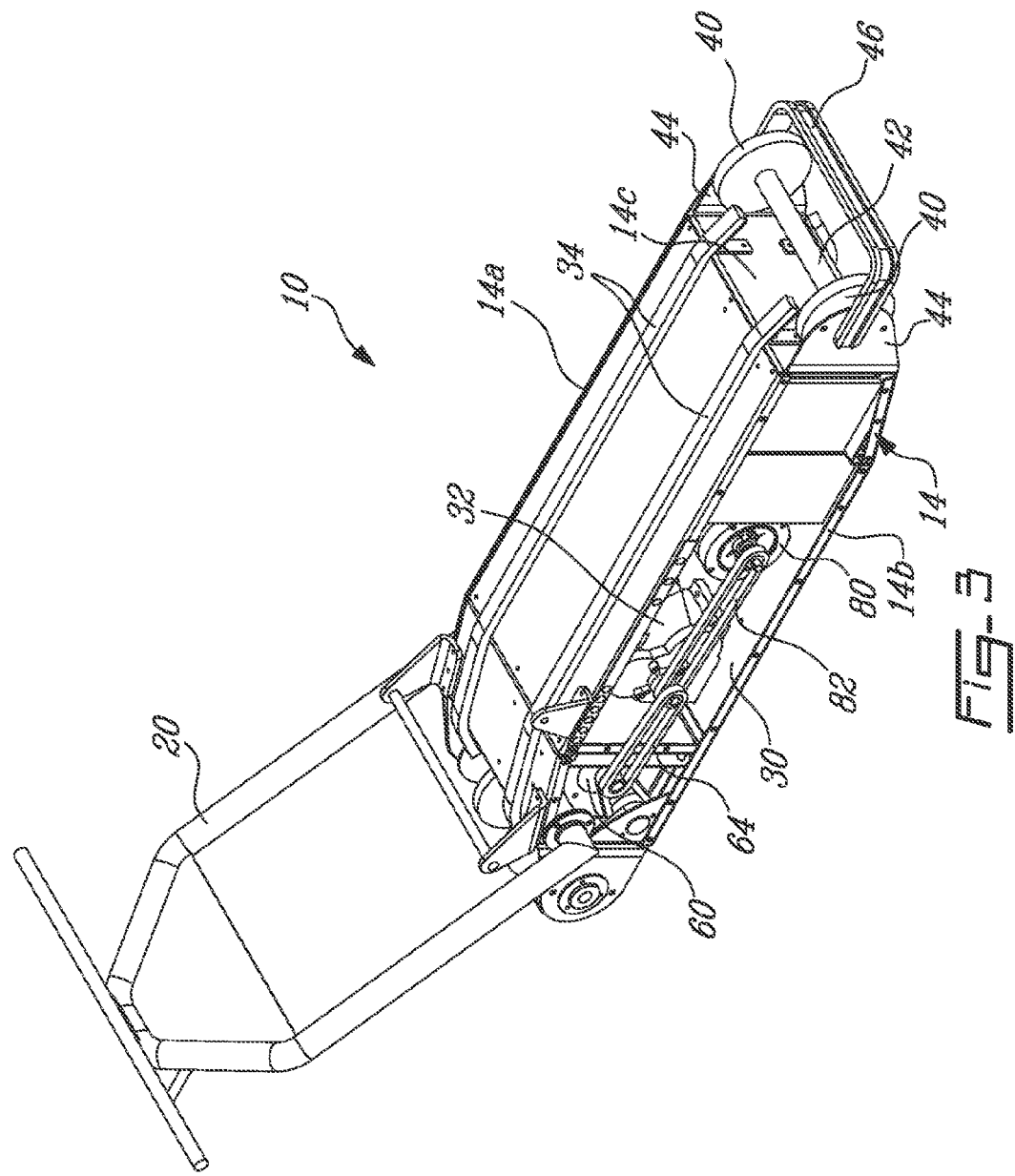
FIG. 3 is a view similar to FIG. 1 but shows the apparatus without its track and without the lateral walls on the sides of its housing.
Figure 4:
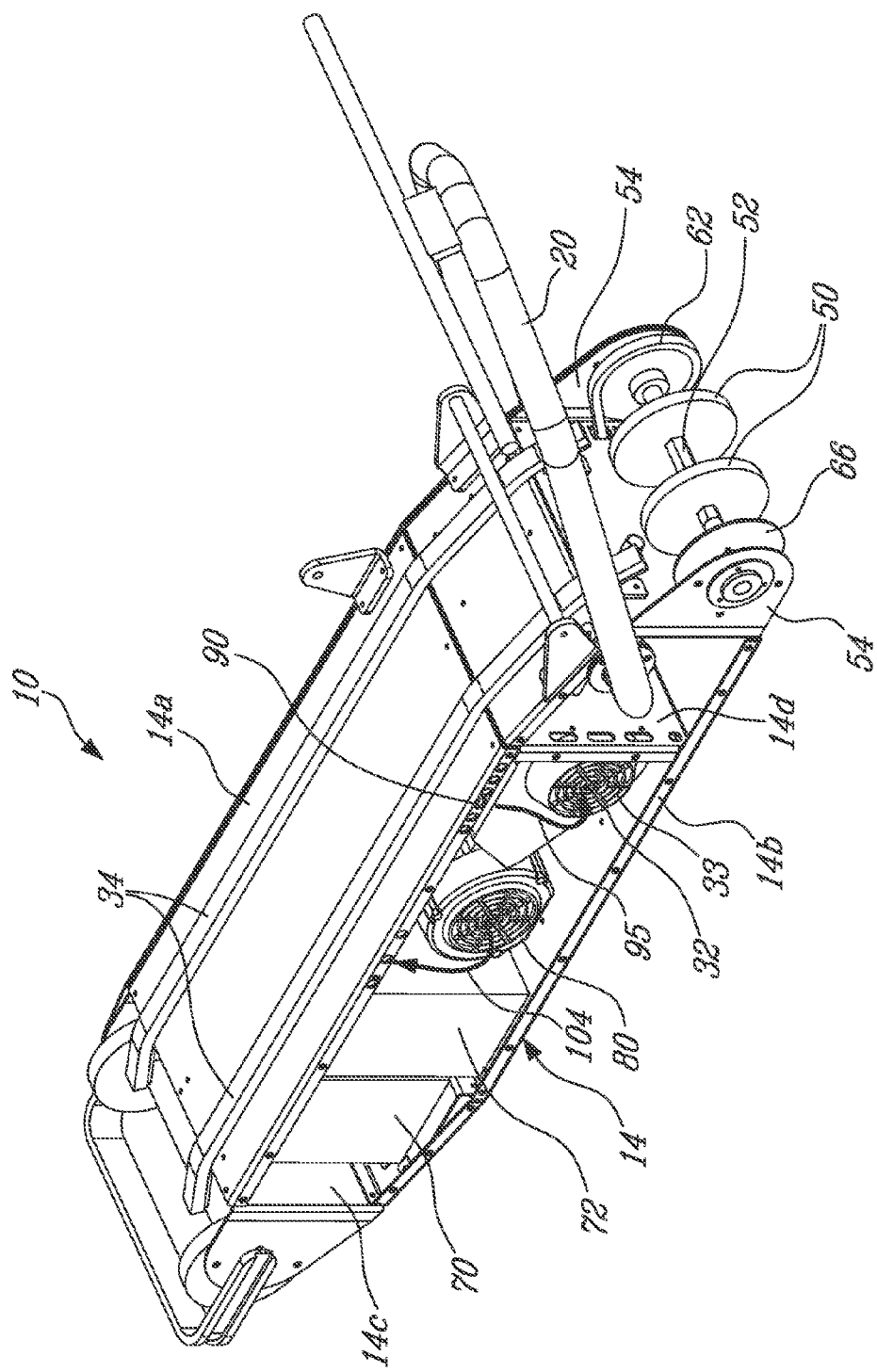
FIG. 4 is a view similar to FIG. 3 but shows the left side of the apparatus, as seen from the rear.
Figure 5:
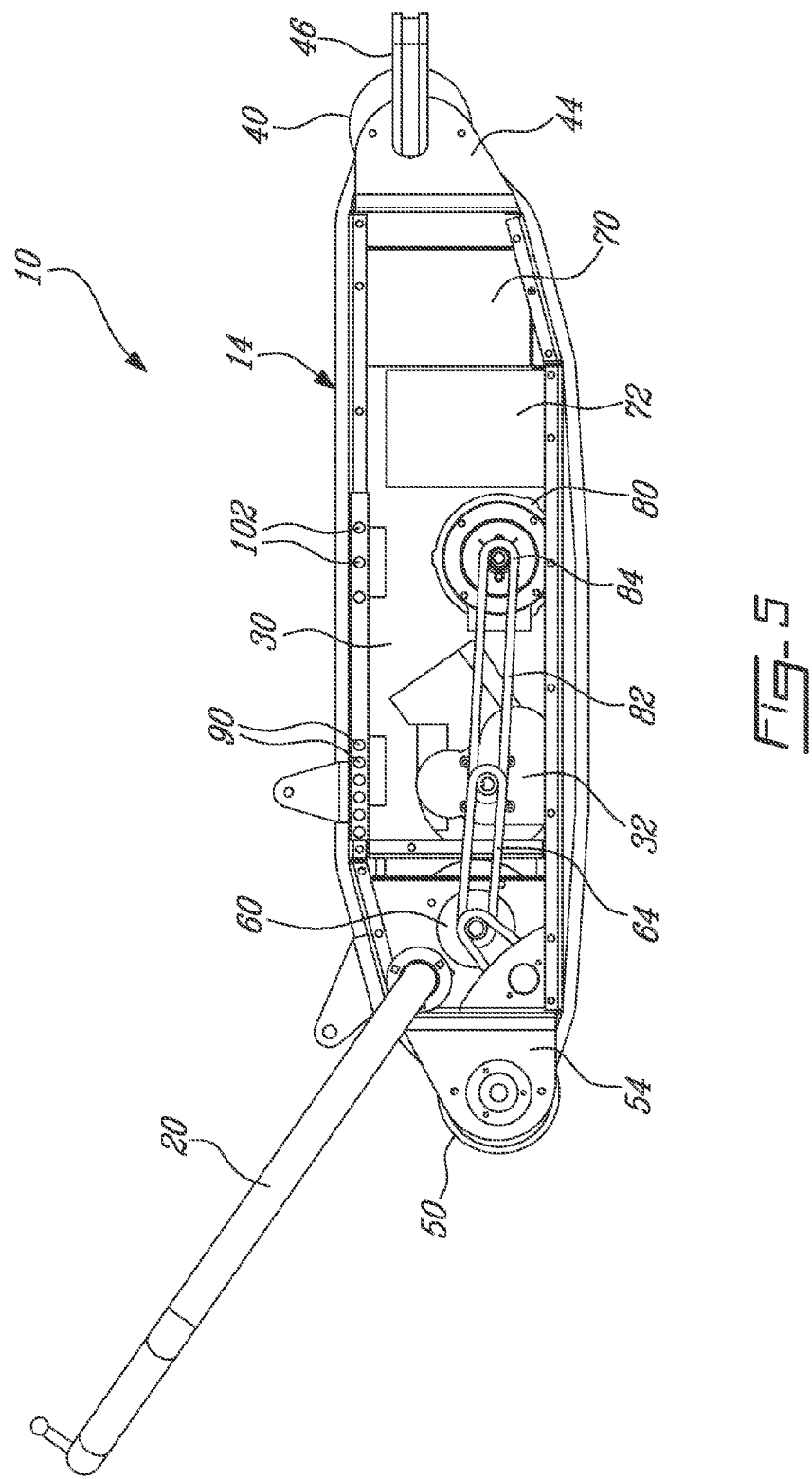
FIG. 5 is a right side view of the apparatus shown in FIG. 3.

FIG. 2 is a side view of the apparatus 10 shown in FIG. 1. FIGS. 1 and 2 illustrate the assembled apparatus 10. FIG. 3 is a view similar to FIG. 1 but shows the apparatus without its track 12 and without the lateral walls 16 on the sides of its housing 14. FIG. 4 is a view similar to FIG. 3 but shows the left side of the apparatus 10 as seen from the rear. FIG. 5 is a right side view of the apparatus 10 shown in FIG. 3.

As can be seen particularly in FIGS. 3 and 4, the housing 14 defines an inner chamber 30 in which different parts of the apparatus 10 are located, in particular the engine 32. The housing 14 also includes a top wall 14a, a bottom wall 14b, a front wall 14c and a rear wall. The housing 14 has a reinforced structure which can include one or several internal walls to divide the inner chamber 30. The compartments communicate with each other.

A pair of top skids 34 is disposed longitudinally on the top wall 14a of the housing 14. A pair of bottom skids, similar to those on the top wall 14a, is disposed longitudinally on the bottom wall 14b of the housing 14. The skids are made of a material having a very low friction coefficient. They allow, among other things, the track 12 to rotate around the housing 14 and to reduce friction between the inner face of the track 12 and the outside of the housing 14. They also serve as guides to keep the track 12 in registry with the axis of the apparatus 10. The skids extend for several centimeters beyond the front and rear ends of the top wall 14a and the bottom wall 14b so as to support the track 12 along almost the entire length of the apparatus 10.

If desired, the skids can be used together with one or more pairs of rollers or small wheels that are operatively connected to the housing 14 and that are engaging the inner face of the track 12. They will further reduce the friction between the inner face of the track 12 and the outside of the housing 14.

At least one front roller is rotatably connected on the front of the housing 14. In the illustrated example, two front rollers 40 are provided. The front rollers 40 are coaxially mounted around a front transversal axle 42 which is supported by an internally-greased axle connected at its ends to two opposite plates 44 which are disposed parallel to the longitudinal axis of the apparatus 10. The plates 44 are rigidly connected to the front of the housing 14. Also in the illustrated example, a bumper 46 is provided at the front of the apparatus 10. The ends of the bumper 46 are connected to the two plates 44, as shown particularly in FIGS. 3 and 4. Sufficient clearance is provided between the interior of the bumper 46 and the front rollers 40 to allow the track to rotate around the housing 14 without interfering with the interior of the bumper 46.

At least one rear roller is rotatably connected at the rear of the housing 14. In the illustrated example, two rear rollers 50 are provided. The rear rollers 50 are coaxially mounted around a rear transversal axle 52 which is supported at its ends by bearings located in two opposite plates 54 disposed parallel to the longitudinal axis of the apparatus 10. The plates 54 are rigidly connected to the rear of the housing 14. Also in the illustrated example, a mechanical connection is provided between the output shaft of a transmission 60 located within the housing 14 and the rear transversal axle 52. The rear rollers 50 are thus used to drive the track 12 in rotation so as to move the apparatus 10.

Different types of mechanical connections can be used between the transmission 60 and the rear transversal axle 52. The illustrated one includes a chain 62 or drivebelt and provides a reduction of the rotation speed between the output shaft of the transmission 60 and the rear transversal axle 52. Other types of connections and configurations are also possible. The mechanical connection between the motor 32 and the transmission 60 is provided by a chain 64 or drivebelt. The transmission 60 can enable either a forward or reverse motion of the apparatus 10, for instance. It can have one or more speeds or be a variable speed transmission. The transmission 60 can include and/or be used together with a clutch, such as a centrifugal clutch, to initiate the motion of the apparatus 10.

In the illustrated example, and as best shown in FIG. 4, the chain 62 goes inside the housing 14 through ports made in the rear wall thereof. It engages a corresponding sprocket that is mechanically connected to the output shaft of the transmission 60. The area around this sprocket is sealed from the rest of the housing 14.

In the illustrated example, the rear transversal axle 52 also carries a brake disk 66, as shown in FIG. 4. This brake disk 66 is disposed near the left end of the rear transversal axle 52. The brake pads are attached to the housing 14 and can be operated by the operator 22, for instance from the handlebar 20 (see FIG. 13). Other configurations and arrangements are also possible.

As aforesaid, the drive motor for the track 12 of the example illustrated in FIGS. 1 to 6 is a gasoline engine 32. It is located immediately in front of the transmission 60. An intermediary transversal wall 14d is present in the illustrated example so as to reinforce the area between the engine 32 and the transmission 60. The engine 32 is supplied with fuel from a fuel tank 70 located at the front of the inner chamber 30 of the apparatus 10. A battery or battery unit 72 is disposed beside the fuel tank 70. This battery or battery unit 72 is, among other things, provided to power the electric starter of the engine 32. The operator 22 is thus able to start or to stop the engine 32 without having to access it directly.

The apparatus 10 shown in FIGS. 1 to 6 also includes a generator 80 provided in the inner chamber 30 and can produce electricity intended to power one or more external equipment at a voltage, corresponding in particular to that of a domestic electrical outlet, for example 110V or 220V/240V at 60 Hz or also at 50 Hz. One or more electrical sockets are available on the apparatus 10 and/or on the generator 80 itself. The generator 80 includes an internal rotor which can be rotatably driven by the engine 32. The possibility of generating electricity within the apparatus 10 can be very advantageous to users such as workers operating power tools at remote sites, or to owners of cottages located far from inhabited areas. Many other uses can be devised. A generator with a power rating of 4000 to 6000 W can be provided in an apparatus 10 of the size shown. A smaller or even a larger generator is also possible.

The axis of the generator 80 is disposed transversely with reference to the longitudinal axis of the apparatus 10. The generator 80 could also be disposed in some other way in certain models. It is mechanically connected to the output shaft of the engine 32, for instance by a chain 82 or drivebelt. An electric clutch 84 can be provided on the output shaft of the generator 80. This activates the mechanical connection between the generator 80 and the engine 32 to be engaged or disengaged remotely. Thus, when there is no need for the generator 80 to be used, for instance when the apparatus 10 is in motion, unnecessary rotation of the rotor of the generator 80 can be avoided. When the generator 80 is in operation, the transmission 60 of the apparatus 10 is set to neutral. Other configurations and arrangements are also possible.

The admission of fresh air into the interior of the inner chamber 30 of the housing 14 is effected through a series of apertures 90 provided on at least one side of the housing 14, immediately beneath the top wall 14a, in the illustrated example. These apertures 90 have a relatively small diameter so as to minimize snow and debris ingestion, such as twigs or others. Air passing through the apertures 90 goes into an inlet box 92 which collects the air coming from all the apertures 90 on each side of the housing 14. When the apparatus 10 is in operation, the inlet box 92 is heated from below by the heat released from the engine 32 and which circulates in the inner chamber 30. This heat allows the inner chamber 30 to be kept well above freezing point (0° C.) even if the outside temperature is very cold, for example below −20° C. With this heat, any snow particle entering the inlet box 92 can melt and drip out toward the exterior, even during cold weather. The air exits the inlet box 92 through an exit pipe 94 which is circular in the illustrated example. The top of the exit pipe 94 can be raised several millimeters above the bottom of the inlet box 92 so as to prevent the flow of water directly toward the inner chamber 30. Variants are possible as well.

Figure 6:
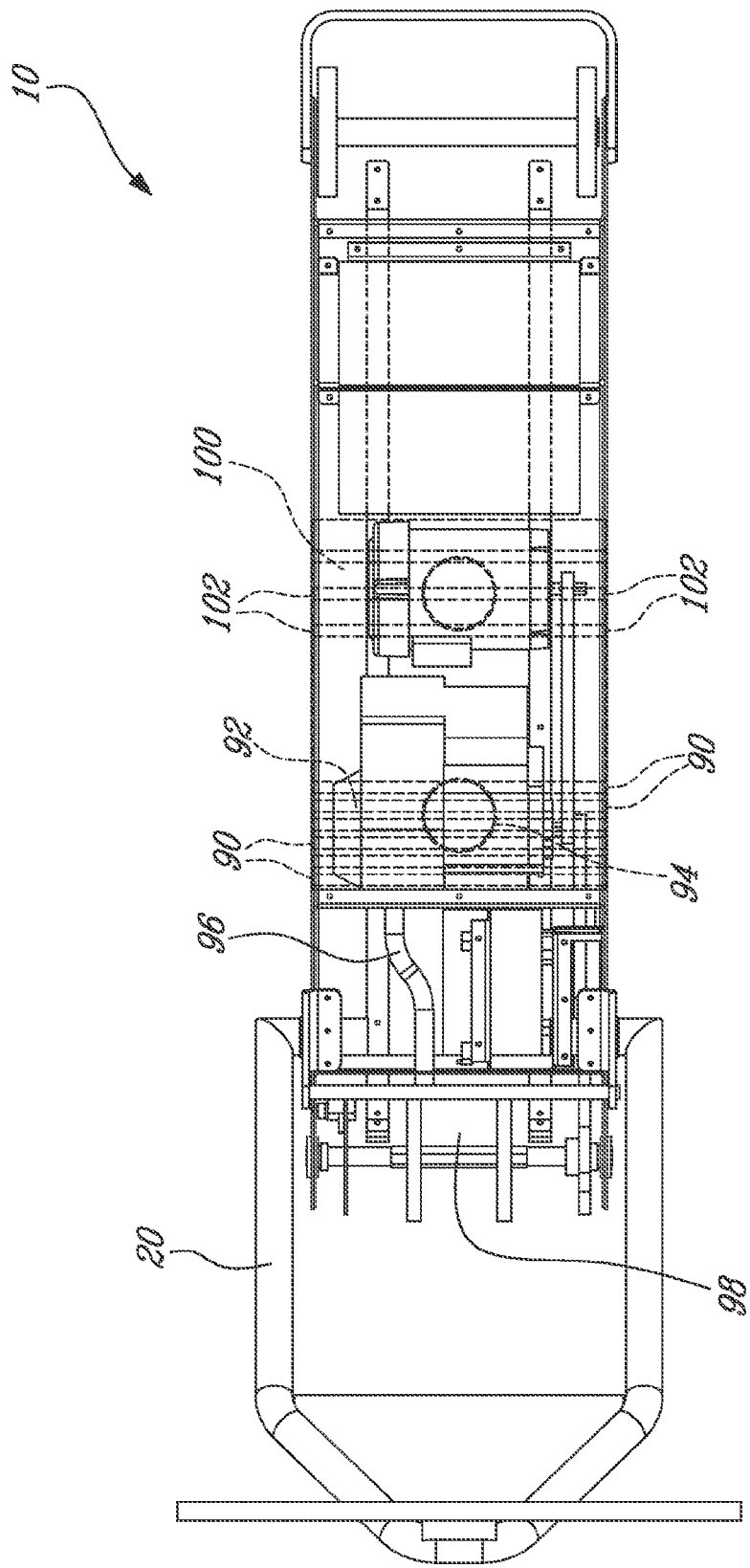
FIG. 6 is a top view of the apparatus shown in FIG. 3.

FIG. 6 is a top view of the apparatus 10 shown in FIG. 3. The air inlet box 92 is seen in this figure. Air leaving the inlet box 92 is then channeled into a flexible duct 95 (schematically illustrated in FIG. 4) leading to the inlet 33 of the cooling fan shroud located on the engine 32. The fan in the engine 32 thus generates the necessary suction force to draw air through the apertures 90. The cooling air passes around the cylinder or cylinders of the engine 32 and ends up in the interior of the inner chamber 30.

The evacuation of air from the interior of the illustrated apparatus 10 can be effected in two ways. On the one hand, the fuel combustion in the engine 32 generates exhaust gases. The air used in this combustion process is admitted into the interior of the engine 32 from the interior of the inner chamber 30 or it can also come directly from the inlet box 92 for some engines. The exhaust gases coming out of the cylinder or cylinders are then directed toward the rear of the apparatus 10 using an exhaust pipe 96 which is shown in FIG. 6. In the illustrated example, the exit of the exhaust pipe 96 is located in the space 98 where the rear transversal axle 52 and the two rear rollers 50 are located. This space 98 is partially blocked by the presence of the track 12 when the apparatus 10 is assembled. This configuration, among other things, reduces noise as well as preventing any possible contact between the skin or cloths of the operator 22 and the hot exit of the exhaust pipe 96. Other configurations and arrangements are also possible.

Some air is also evacuated from the interior of the inner chamber 30 through an air outlet which forms part of the ventilation circuit. Air passing through the outlet goes first into the cooling circuit of the generator 80 and then flows through a flexible duct 104 (shown schematically in FIG. 4) up to the entrance of the air outlet box 100. The outlet box 100 has a similar structure to that of the inlet box 92. The air is then evacuated through the apertures 102 located on at least one side of the housing 14. Other configurations and arrangements are also possible.

When the generator 80 is in operation, the fan, which is integrated into the generator 80, contributes to the displacement of air so as to increase the air flow that cools it. Additional fans disposed in series on the flexible ducts connected to the air inlet and air outlet can further increase the air flow if the temperature inside the inner chamber 30 becomes too high. These fans can be automatically switched on and off using a thermostat provided with a temperature sensor or another mechanism. Again, other configurations and arrangements are also possible.

The apparatus 10 is configured in such a way that a positive pressure is created in the inner chamber 30. This can be achieved by providing an overall air inlet area greater than the overall air outlet area. In the example, the number of apertures 90 is greater than the number of apertures 102. The positive pressure, among other things, improves the watertightness of the housing 14.

When the apparatus 10 is in motion, the sides of the housing 14 are made watertight using lateral walls 16 shown in FIGS. 1 and 2. These lateral walls 16 are bolted or otherwise attached to the rest of the housing 14. The interior of the housing 14 thus remains watertight and dry while the apparatus 10 is in operation.

As is shown in FIG. 5, the underside of the housing 14 is convex at its center. This heightening is about 3 cm at the front and at the rear of the track 12 in the apparatus 10 of the illustrated example. This central part corresponds to about one third of the length of the apparatus 10. The heightening, in particular, facilitates a yawing motion when making a turn as well as the manual pivoting of the apparatus 10 on hard and rough surfaces, for example on asphalt or concrete. Moreover, the front of the bottom wall 14b defines an angle with reference to the horizontal. The front transversal axle 42 is thus higher than the rear transversal axle 52. This also facilitates passage over obstacles. Variants are possible as well.

Figure 7:
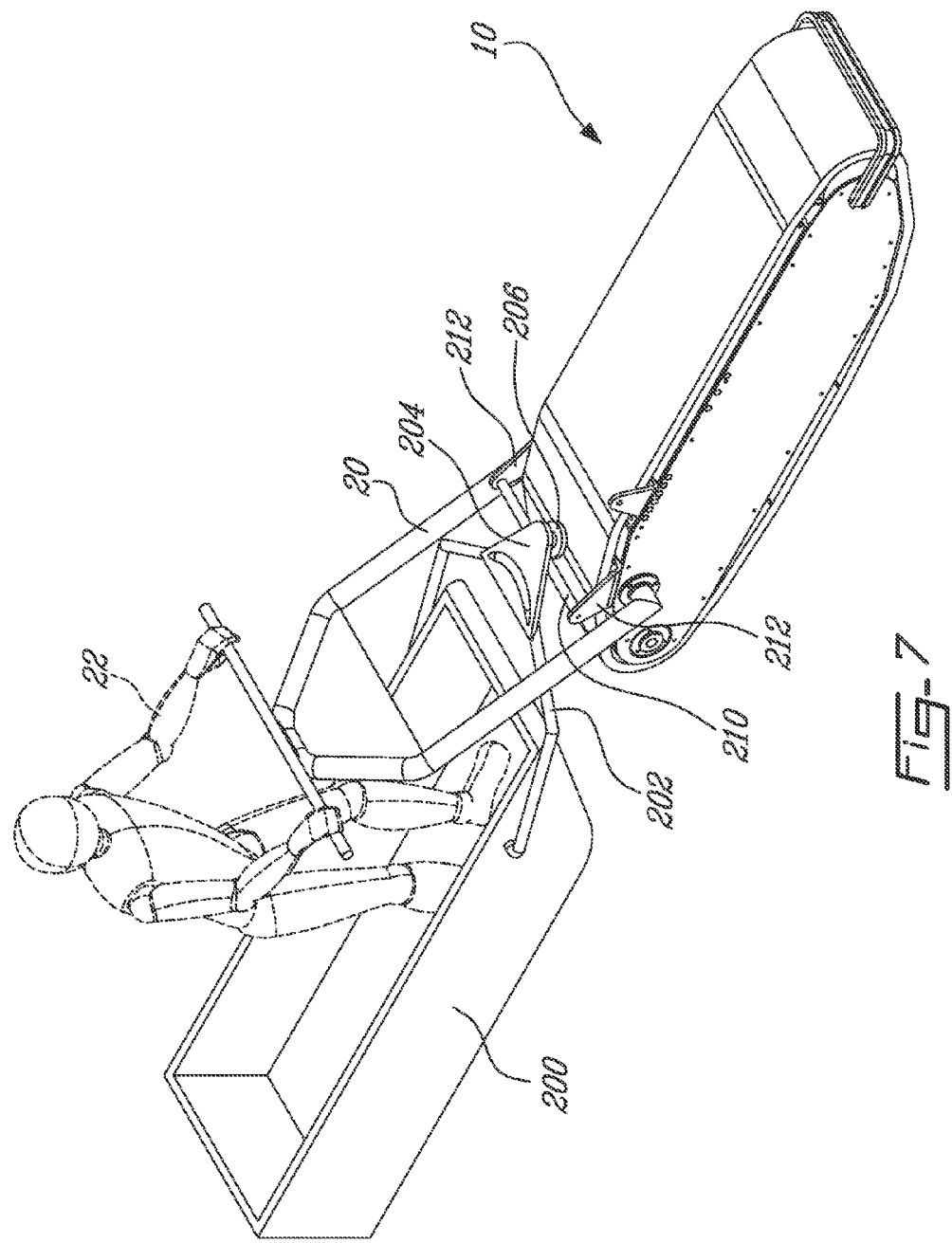
FIG. 7 is a view similar to FIG. 1 but where the operator is standing on a sled hitched to the apparatus.
Figure 8:
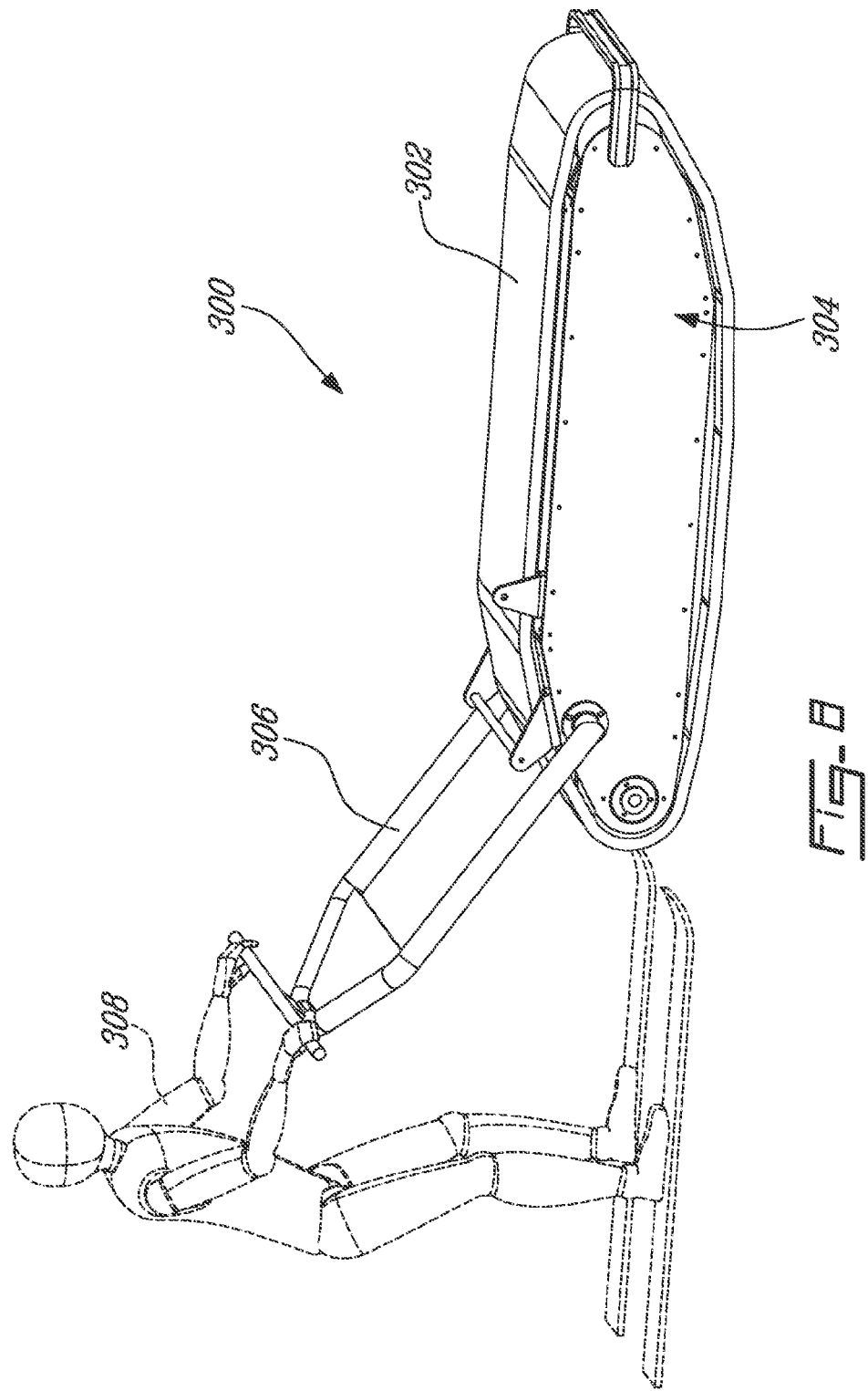
Figure 9:
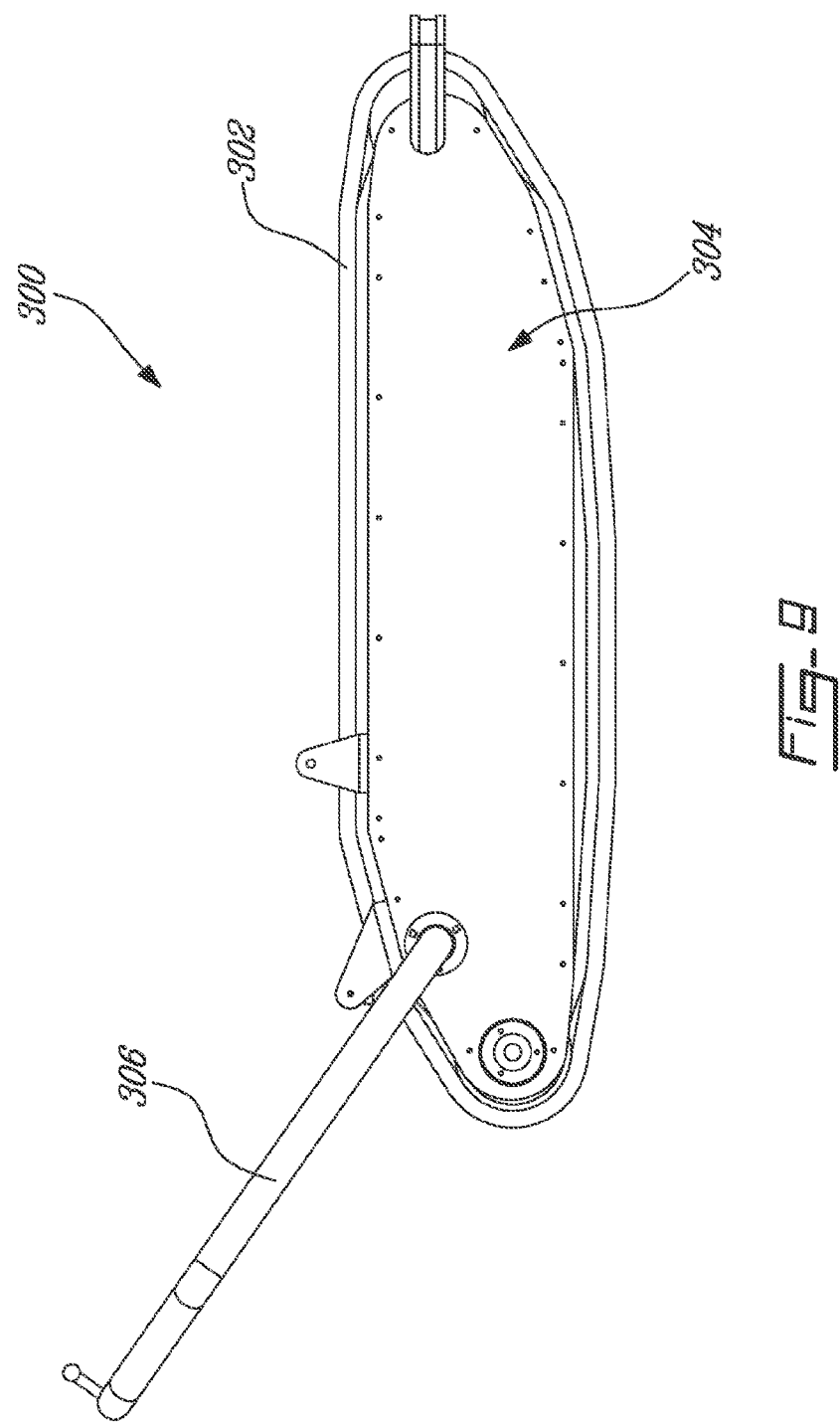

FIG. 7 is a view similar to FIG. 1 but where the operator is standing on a sled 200 hitched to the apparatus 10. The hitch 202 of the sled 200 is connected to a support 210 which, in the illustrated example, is in the form of a transversal strut that is straight or slightly curved towards the rear at its center. The transversal strut 210 is supported using two corresponding plates 212 projecting towards the top of the housing 14. The hitch 202 includes two retainer arms of the sled 200, which arms are attached to a plate 204 and can pivot around a vertical axis where it joins a fastening element 206. The fastening element 206 can slide from left to right along the transversal strut 210 using two pulleys provided on either side of the fastening element 206. In a turn, the fastening member 206 can thus move toward one of the ends of the transversal strut 210, this facilitating handling of the apparatus 10 and reducing the effort required from the operator 22.

Another possible implementation is to provide the apparatus 10 with a generator 80 that can also be used as a motor, thus as a generator/motor, in an electrical power mode. The electrical power to operate the generator/motor 80 in the electrical power mode can be provided for instance by the battery unit 72 and/or from additional batteries. The operator could choose between a fuel power mode and the electrical power mode, depending on the needs. For instance, when minimizing the noise is required, turning off the engine 32 and using the electrical power mode will be very useful. Both modes can even be selected automatically and/or be possibly used as the same time to create a "hybrid" mode.

Still, if desired, the transmission 60 can be simplified by omitting the gears allowing the apparatus 10 to back up. Instead, one can use the generator/motor 80 to rotate the track 12 in the opposite direction, thereby moving the apparatus 10 in the reverse direction. Another possible implementation is to provide the engine 32 with an electronic engine reversing system that can make the engine 32 rotate in the opposite direction to back up. This way, the transmission 60 can be made smaller and lighter. Some implementations may even omit the transmission 60 entirely.

FIGS. 8 to 13 are views similar to FIGS. 1 to 6 but show a second model of apparatus 300 in which only an electric motor is used. This apparatus 300 is otherwise similar to the apparatus 10 shown in the previous example. The apparatus 300 includes, among other things, a track 302, a watertight housing 304 and a handlebar 306, which handlebar 306 is held by an operator 308. The apparatus 300 can also be used with the sled 200 shown in FIG. 7.

Figure 10:
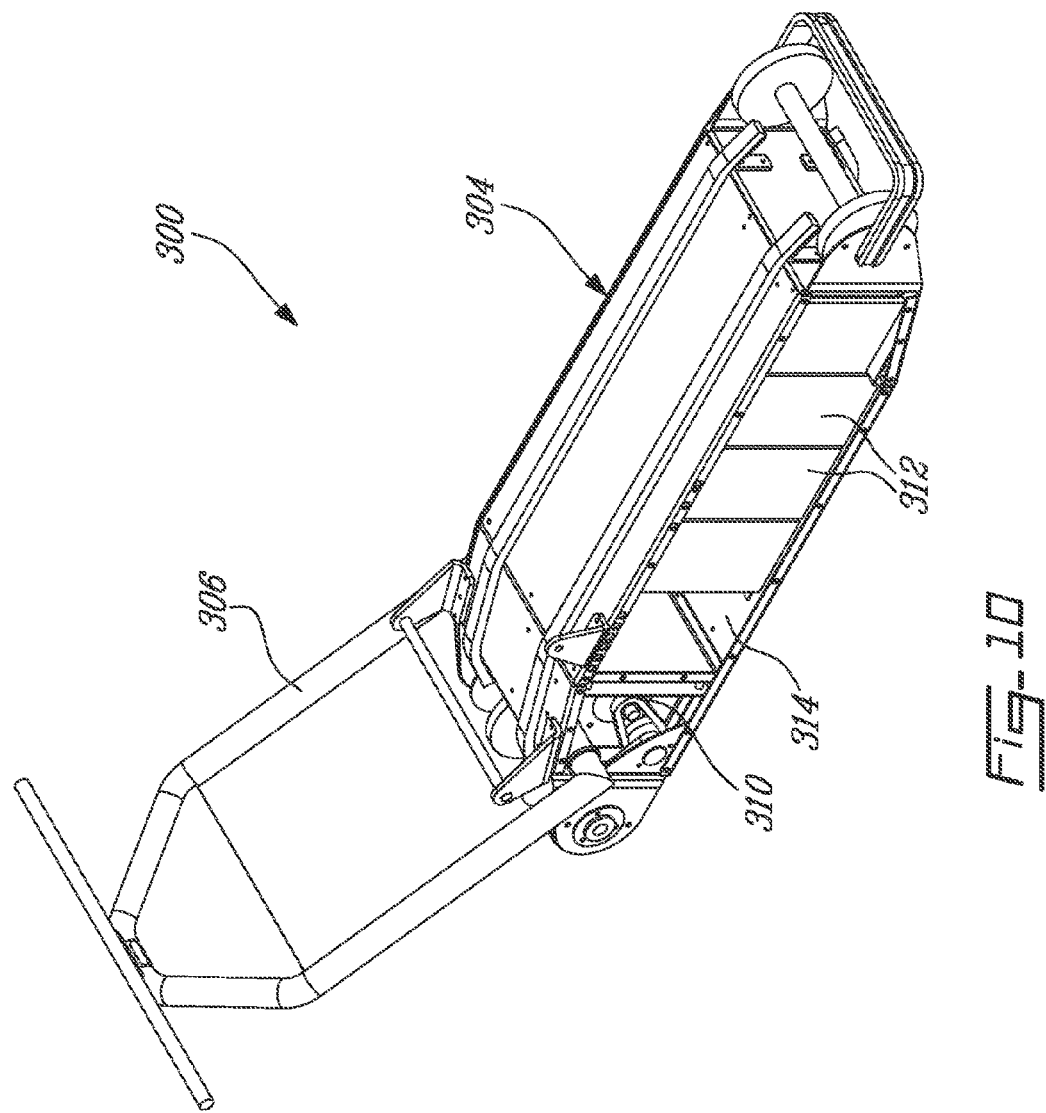

The track 302 of the apparatus 300 is rotatably driven by an electric motor 310 (FIG. 10). This motor 310 is powered using electricity from one or several batteries 312 are also located within the inner chamber 314 of the housing 304. The electric motor 310 can either be of type AC or DC, with or without permanent magnets. A group of four deep cycle lead batteries 312 is shown in the illustrated example. The number and type of batteries 312 can differ according to requirements. The batteries 312 are connected to an electric controller which the operator 308 can control from the handlebar 306. The various electrical connections are not shown in the figures so as to simplify the illustrations.

Other configurations and arrangements are possible. For instance, the handlebar 306 can be omitted in some implementations.

In operation, the electric motor 310 releases heat. This heat can account for about 10% of the electrical energy drawn from the batteries 312, depending on the kinds of batteries being used. The heat thus dissipated is used within an inner chamber 314 of the apparatus 300 to keep the batteries 312 warm when the outside temperature is very cold. This heat thus makes it possible to keep the batteries at an optimal temperature despite very cold weather. The optimal temperature can be for instance in the range of 20 to 25° C. Other temperatures are also possible. This heat recovery is beneficial because most batteries lose their efficiency in cold weather. This is particularly the case of lead batteries. Although other batteries with better performance exist, lead batteries remain an attractive choice because they are easily available and relatively inexpensive. They withstand cold weather better than nickel or lithium batteries for instance. However, the efficiency of lead batteries diminishes almost linearly with reference to temperature, going for example from 100% at 25° C. down to 30% at −40° C., depending on the exact type of battery. The decrease in efficiency thus has a direct impact on the autonomy of the apparatus 300. By keeping the heat inside the housing 304 during cold weather, the batteries 312 can then maintain a much higher efficiency than that at low temperatures. The interior of the housing 304 can also be insulated to help conserve heat.

An internal ventilation circuit is provided in case of overheating, for example when the apparatus 300 is operating in relatively mild weather and the electric motor 310 is intensively solicited. This internal ventilation circuit is part of the ventilation circuit. It can include a thermostat which can activate at least one fan providing a supply of air from the outside to dissipate interior heat. The air inlet and air outlet can be located in the top part of the handlebar 306 at a certain distance from one another. The air then circulates in the tubes forming the sides of the handlebar 306. The fan or fans can be provided in the housing 304 or alternatively in the handlebar 306.

The junction between the handlebar 306 and the housing 304 is configured so as to provide an air passage between them. This way, the housing 304 can have a very watertight structure up to the height of the air inlet and the air outlet on the handlebar 306. A positive pressure is maintained within the interior of the inner chamber 314 to mitigate the risks of having water infiltration at locations which may not be completely watertight. The apparatus 300 can then even be immersed in water from time or time, as might be required for instance when the apparatus 300 must cross an unfrozen stream or similar body of water.

FIG. 13 is a top plan view of the apparatus 300. Air can circulate in an air path circuit going around the batteries 312, for instance going forward in a space along the left side thereof, then from left to right in a space at the front of the inner chamber 314, and going backward in a space along the right side of the batteries 312 before exiting the housing 304. The spaces at the left and the right side of the batteries 312 can be separated from one another using a longitudinally-disposed foam element or the like provided along the top side of the batteries 312 and, if necessary, along the bottom side thereof. Other configurations and arrangements are also possible.

If desired, it is possible to provide a heating element, for instance a heating cable, inside the housing 304 to keep the batteries 312 warm when they are being charged outdoors during cold weather and also when they are being stored outdoors.

It is also possible to provide a fixed support located above the track 12, 302 and connected to the housing 14. This support can be provided on either of the examples of apparatus 10, 300 shown herein. The support can be useful for carrying equipment, for example as a tool box and/or a cargo box and/or a fuel tank and/or batteries.

The present detailed description and appended figures are only examples. A person working in this field will be able to see that variations can be made while still staying within the framework of the proposed concept.

What is claimed is:

1. A method of operating a motorized pulling apparatus of the type including an elongated watertight housing extending along a longitudinal axis and defining an inner chamber inside which a motor is located, and also including a track disposed around the housing along its longitudinal axis and enabling the apparatus to move when the track is rotatably driven around the housing by means of the motor, the method including the following simultaneous steps:

maintaining a minimum temperature within the inner chamber using heat released by the motor;

evacuating heat from the inner chamber if the temperature exceeds a threshold value; and maintaining a positive pressure inside the inner chamber.

2. The method according to claim 1, wherein it is includes: moving the apparatus over a surface.

3. The method according to claim 2, wherein the surface is a snow-covered terrain.

4. The method according to claim 1, wherein the step of moving the apparatus includes:

supplying the engine with fuel from at least one fuel tank.

5. The method according to claim 4, wherein the at least one fuel tank is located within the inner chamber.

6. The method according to claim 1, wherein the step of moving the apparatus includes:

powering the motor with electricity from at least one battery.

7. The method according to claim 6, wherein the at least one battery is located within the inner chamber.

* * * * *